United States Patent [19]

Bubik et al.

[11] Patent Number: 5,268,077
[45] Date of Patent: Dec. 7, 1993

[54] APPARATUS AND METHOD FOR DEAERATING OR DEGASSING A PAPER STOCK SUSPENSION

[75] Inventors: Alfred Bubik, Ravensburg; Anton Gmeiner, Ravensburg-Sickenreid; Walter Stein, Ravensburg, all of Fed. Rep. of Germany

[73] Assignee: Sulzer Esher Wyss GmbH, Ravensburg, Fed. Rep. of Germany

[21] Appl. No.: 841,485

[22] Filed: Feb. 26, 1992

[30] Foreign Application Priority Data

Feb. 27, 1991 [DE] Fed. Rep. of Germany ....... 4106140

[51] Int. Cl.$^5$ .............................................. B01D 19/00
[52] U.S. Cl. ................................ 162/380; 162/139; 96/197
[58] Field of Search ................... 162/380, 336, 339; 55/52, 55, 199, 194; 239/548, 553, 566, 489, 343, 589, 601

[56] References Cited

U.S. PATENT DOCUMENTS

| | | | |
|---|---|---|---|
| 1,191,559 | 7/1916 | Buck | 55/194 |
| 1,416,632 | 5/1922 | Fothergill | 55/52 |
| 2,642,950 | 6/1953 | Clark | 162/380 |
| 3,206,917 | 9/1965 | Kaiser | 162/380 |
| 3,266,737 | 8/1966 | Nees | 239/548 |
| 3,358,425 | 12/1967 | Burnham | 55/52 |
| 3,421,622 | 1/1969 | Wurtmann | 55/194 |
| 3,538,680 | 11/1970 | Kaiser | 55/194 |
| 3,720,315 | 3/1973 | Kaiser | |
| 4,097,000 | 6/1978 | Derr | 239/601 |
| 4,184,638 | 1/1980 | Ogasawara et al. | 239/601 |
| 4,238,208 | 12/1980 | Frykhult | 162/380 |
| 4,435,891 | 3/1984 | Nicholson | 239/566 |
| 4,515,314 | 5/1985 | Currall | 239/489 |
| 4,971,252 | 11/1990 | Tasaki | 239/343 |

FOREIGN PATENT DOCUMENTS

| | | | |
|---|---|---|---|
| 294962 | 11/1914 | Fed. Rep. of Germany | 55/194 |
| 1036030 | 1/1958 | Fed. Rep. of Germany . | |
| 2713747 | 9/1978 | Fed. Rep. of Germany | 239/489 |
| 2846708 | 6/1979 | Fed. Rep. of Germany . | |
| 3414770 | 11/1985 | Fed. Rep. of Germany . | |
| 2082470 | 3/1982 | United Kingdom . | |

Primary Examiner—W. Gary Jones
Assistant Examiner—Brenda Lamb
Attorney, Agent, or Firm—Sandler Greenblum & Bernstein

[57] ABSTRACT

The stock stream of a pre-cleaned paper stock suspension is sub-divided into extremely small partial jets in a chamber of a compartment. Each such partial jet or stream has a throughflow volume of approximately 50 liters/min. to 80 liters/min. and is directed with great turbulence against an impact wall within the closed chamber of the compartment at jet velocities in the order of about 10 m/sec. to 12 m/sec. and at an absolute pressure of about 0.5 to 0.8 bar absolute, the partial jets then being completely sprayed at such impact wall. The paper stock suspension which is to be deaerated has as large as possible surface area, so that the air is efficiently released at a negative pressure or vacuum of approximately 0.05 bar prevailing in the chamber and then can be suctionally removed. The division of the stream of the paper stock suspension into partial jets is accomplished by a distributor through which extends a predetermined number of throughflow openings defined by bores. The throughflow openings each have, for example, the shape of a stepped constricting or widening diffusor. Turbulence-generators can increase the action of the stepped diffusors.

23 Claims, 3 Drawing Sheets

APPARATUS AND METHOD FOR DEAERATING OR DEGASSING A PAPER STOCK SUSPENSION

BACKGROUND OF THE INVENTION

1. Field of Invention

The present invention relates to a new and improved apparatus and method for deaerating or degassing a paper stock suspension.

Generally speaking, the apparatus of the present development for deaerating or degassing a paper stock suspension is of the type wherein partial jets or streams of the paper stock suspension are directed against an impact member, such as an impact wall located within a compartment, for instance, within a first chamber which is at negative pressure. Impacting of the partial jets at the impact member causes spraying or spattering and thus atomization of the paper stock suspension. Air is separated from the sprayed partial jets and the thus separated air is suctionally removed from the first chamber. An enclosure, like a container encloses or delimits the compartment. A distributor or distributor device provided with bores defining throughflow openings introduces the paper stock suspension to be deaerated or degassed into, for instance, a second chamber of the compartment. The distributor is provided with bores defining throughflow openings for the paper stock suspension which is to be deaerated or degassed. The deaerated or degassed paper stock suspension is removed by suitable means, such as a conduit or line from the deaeration apparatus and a further means, such as a conduit or line removes the separated air from the deaeration apparatus.

In the description to follow, the term "deaeration" will be sometimes generally used to encompass both the removal of air and, where appropriate, gases.

2. Discussion of the Background and Material Information

Deaeration or degassing of a paper stock suspension under vacuum conditions, especially at approximately boiling conditions, is required for high-speed papermaking machines where there are fabricated different types of paper like, for example, newsprint paper, light weight coated paper, coated paper, teletype paper, just to mention some of these, from paper stock suspensions containing raw materials, such as, for example, mechanical wood pulp, deinked sorted or classified paper or cellulose. As a general rule, deaeration of the paper stock suspension is performed after there have been removed deleterious or disturbing particles, such as dirt, from the paper stock suspension.

Deaeration is accomplished by different types of deaeration equipment which are quite familiar to those skilled in this technology under commercial trademarks, such as "DECULATOR", "ENSOVAC", "CLEANVAC" or "PERIVAC". With such prior art systems the good stock obtained following a pre-cleaning operation normally from a so-called cleaner battery or array of cleaners, is sprayed against a wall which bounds a compartment in which there is present a high vacuum or negative pressure. As a result, there is caused spraying or atomization of the paper stock suspension, so that the air can rapidly escape from such paper stock suspension. This compartment which is provided for this purpose, must be of considerable size, requiring complicated constructions of the enclosure containers subjected to vacuum conditions.

SUMMARY OF THE INVENTION

Therefore, with the foregoing in mind, it is a primary object of the present invention to provide an improved apparatus for, and method of, deaerating or degassing a paper stock suspension which is not afflicted with the aforementioned limitations and drawbacks of the prior art.

Another and more specific object of the present invention aims at providing an improved construction of apparatus for deaerating or degassing a paper stock suspension, wherein the prior art deaeration technique can be accomplished in a more efficient manner, so that there can be realized a saving in the size of the apparatus and the attendant installation, and thus, a reduction in the space requirements in contrast to the prior art.

Still a further noteworthy object of the present invention concerns the provision of an improved apparatus for deaerating a paper stock suspension, which deaerating apparatus is relatively simple in construction and design, extremely reliable in operation, not readily subject to breakdown or malfunction, requires relatively little maintenance and servicing, and does not need a large amount of space.

Now in order to implement these and still further objects of the present invention, which will become more readily apparent as the description proceeds, the apparatus for deaerating a paper stock suspension of the present development is manifested, among other things, by the features that the bores defining the throughflow openings of the distributor and which serve for the formation of the partial jets of the paper stock suspension to be deaerated are arranged in the distributor such that the entire stream or feed of the paper stock suspension is divided into a plurality of small partial jets each having a volume flow of maximum 100 liters/min., and the bores defining these throughflow openings are each provided with means or facilities for increasing the turbulence of the issuing partial jets at the outer surface thereof.

By virtue of the foregoing construction it is possible to obtain an exceedingly fine spraying or atomization of the paper stock suspension in the first chamber of the compartment, resulting in the presence of a maximum liquid surface at the stock suspension jets which, in the presence of a suitable vacuum, that is to say, at approximately boiling state of the liquid of the paper stock suspension, renders possible a desired, optimum deaeration of such paper stock suspension. Consequently, it is possible to reduce the size of the compartment under vacuum in relation to those previously employed. This, in turn, has the beneficial effect of reducing the amount of space required for the deaeration apparatus and also reduces the construction costs thereof.

According to a further feature of the present invention, the distributor or distributor device comprises a plate or plate member mounted in the deaeration apparatus. This plate contains the bores defining the throughflow openings for forming the partial jets. A collecting trough or receiver for receiving and removing the deaerated paper stock suspension is arranged adjacent to and beneath the plate.

A particularly noteworthy aspect of the present invention concerns the configuration of the individual or partial jets, especially with regard to the generation of the rather intensive turbulence produced at these individual or partial jets. In this regard, a particularly good solution is realized in that the division of the paper stock suspension into the partial jets is accomplished by a distributor or distributor device which, for this purpose, is provided with gradual or stepped diffusor-like constricting or converging bores defining the throughflow openings extending therethrough. However, there also can be used stepped diffusor-like diverging or enlarging bores defining the throughflow openings since, under certain circumstances, there thus can be increased the jet turbulence. Further possibilities for practicing the invention will be seen to reside in the construction of the inner surface of the bores defining the throughflow openings, such as providing transverse grooves or grooves which impart a helical-like or spin-like fluid motion or flow to the partial jets.

It is also advantageously possible to separate both spatially and as far as the equipment is concerned, the pre-cleaning of the paper stock suspension to be deaerated,—this pre-cleaning occurring at stock cleaners—from the actual deaeration of the paper stock suspension, so that both operations can be better optimized independently of one another.

Regarding the aforementioned throughflow openings, the present invention further contemplates that such are formed by bores or passages having sections of reduced cross-sectional area with respect to a predetermined direction of flow of the partial jets therethrough.

Still further, and as stated above, the bores defining or forming the throughflow openings can be constituted by stepped diffusors which, in the predetermined direction of flow of the partial jets, possess a step-like constricting or converging diameter.

As also previously explained, it is possible for the bores defining the throughflow openings to be constituted by a stepped diffusor which, in the predetermined direction of flow of the partial jets, possess a step-like diverging or enlarging diameter.

The present invention further contemplates increasing the turbulence of the partial jets in that the bores defining or forming the throughflow openings are constituted by conventional so-called turbulence nozzles.

It is also possible to augment the turbulence of the partial jets by providing the throughflow openings, that is, the bores or passages defining such throughflow openings, at the inner surface or inner wall thereof with groove-like depressions having a directional component oriented transverse to the predetermined direction of flow of the partial jets. These groove-like depressions can impart a helical- or spin-flow to the paper stock suspension flowing therepast.

An increase in the turbulence of the partial jets also is possible by providing grooves at the mouths of the bores forming the throughflow openings at a location where they open into the distributor. These grooves may be appropriately machined at the distributor.

Furthermore, the paper stock suspension which impinges in the form of the partial or individual jets at the aforementioned impact wall can be rapidly removed from this region by using the inherent kinetic energy of such partial or individual jets.

The invention also proposes separation of the deleterious or spurious particles from the paper stock suspension in a cleaner or cleaner installation from where the product, the so-called good stock, is outfed or delivered for deaeration by means of a good stock conduit or line.

This good stock emerges from the cleaner or cleaner installation at a pressure of about 1.4 to 1.8 bars absolute and at this pressure flows through the good stock conduit or line into the second chamber located beneath the distributor where there prevails a pressure of about 0.5 to 0.8 bar absolute, and in the space above the distributor there is maintained a vacuum of approximately 0.05 bar absolute.

It is additionally mentioned that the velocity of each of the partial jet advantageously amounts to about 10 m/sec. to 12 m/sec. and each such partial jet advantageously has a volume flow of about 50 liters/min. to 80 liters/min. at an absolute pressure of about 0.5 to 0.8 bar absolute.

According to a further feature of the present invention, the top surface or side of the plate or plate member serving as the distributor can be provided with grooves or open channels for enabling rapid removal and deposition of the paper stock suspension into the collecting trough.

It is also possible for the bores defining the throughflow openings to open into extensions or protuberances extending beyond the top surface or upper side of the plate constituting the distributor.

The top surface or upper side of the plate serving as the distributor can have a gradient or slope in the direction of the collecting trough.

Moreover, the present invention further contemplates that the impact wall of the enclosing container or housing is constructed and inclined such that it thus transports the impacting paper stock suspension in the direction of the collecting trough.

As previously indicated, the present invention also pertains to an improved method of deaerating a paper stock suspension which comprises the steps of infeeding the paper stock suspension to be deaerated into a second chamber of the compartment maintained at a negative pressure, forming partial jets of the paper stock suspension to be deaerated within a first chamber of the compartment such that each partial jet has a volume flow which does not exceed 100 liters/min., placing the surface of the partial jets into a turbulent state, impinging the partial jets against an impact member so as to cause spraying of the partial jets in order to remove air from the sprayed partial jets to form deaerated paper stock suspension, extracting the air which has been removed from the partial jets of the paper stock suspension from the first chamber of the compartment, and extracting the deaerated paper stock suspension from the first chamber of the compartment.

A further aspect of the deaerating method of the present invention entails maintaining a level of the paper stock suspension to be deaerated within the compartment which is at least 9 meters, at a maximum of 12 meters, above the level of a white water container of the papermaking machine.

According to another feature, it is proposed to admix any excess of deaerated paper stock suspension with the stock stream or feed of the paper stock suspension which is to be deaerated.

A still further aspect of the present invention contemplates undertaking a coarse deaeration of an overflow stock reject of a first cleaning stage of the cleaner or cleaner installation, admixing white water to the overflow stock reject following the coarse deaeration thereof, delivering the overflow stock reject admixed with the white water to a second cleaning stage of the cleaner, cleaning such overflow stock reject admixed with the white water, and reusing such cleaned overflow stock reject.

Still further, it is proposed that good stock delivered by the second cleaning stage is recycled upstream of the first cleaning stage.

According to a further characteristic of the method, the overflow stock reject admixed with the white water is delivered to a further or second deaeration stage which flow communicates with the compartment, then the overflow stock reject admixed with the white water is deaerated at the second deaeration stage and delivered to the papermaking machine.

It is contemplated to advantageously use the method for the deaeration of return- or white water produced at the papermaking machine and to employ the thus deaerated paper stock suspension for the sedimentation of fibers, solids and sludge in sedimentation devices, such as sedimentation funnels.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures there have been generally used the same reference characters to denote the same or analogous components or elements, and wherein.

DETAILED DESCRIPTION OF THE PREFERRED EMBODIMENTS

Describing now the drawings, it is to be understood that only enough of the construction of the deaeration apparatus for the deaeration of a paper stock suspension and the related cleaning installation for a papermaking machine have been depicted therein, in order to simplify the illustration, as needed for those skilled in the art to readily understand the underlying principles and concepts of the present invention.

Figures 1, 1A:
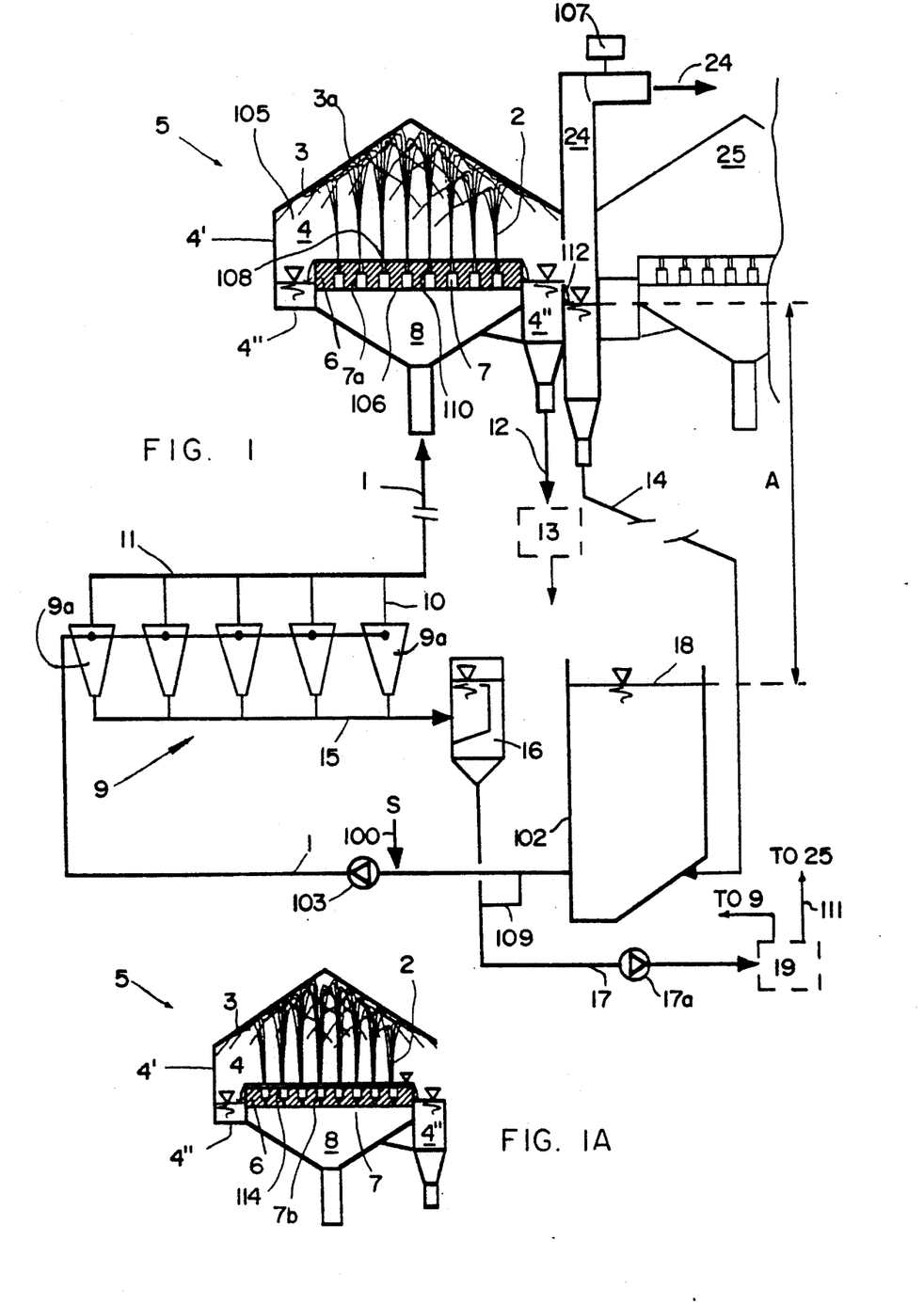
FIG. 1 schematically illustrates part of a papermaking machine including an exemplary embodiment of deaeration apparatus constructed according to the present invention operating in conjunction with a cleaner and on the basis of which there will be considered the present deaeration method for a paper stock suspension.
FIG. 1A depicts part of the arrangement shown in FIG. 1, and specifically, schematically illustrates a modified construction of deaeration apparatus using a different design of distributor from that depicted in FIG. 1.

Turning first to the exemplary embodiment depicted in FIG. 1, it will be understood that the paper stock suspension 1 which is to be deaerated and which is formed from paper stock S infed at a suitable stock infeed or supply means, such as an infeed line or conduit generally indicated by the arrow 100 and water W furnished by, for instance, a supply container or vat 102, such as a white water container, while conveyed by a suitable motor-driven conveying pump 103, is subjected to a pre-cleaning operation at a cleaner or cleaner installation 9 where there are removed deleterious or spurious substances. In the embodiment under discussion, this is accomplished in such conventional cleaner or cleaner installation 9 containing an array of cleaners or cleaner units 9a defining a first cleaning stage from which emerges as good stock the cleaned paper stock suspension at the outflow or delivery lines or conduits 10 of such cleaners 9a at a pressure of approximately 1.4 to 1.8 bars absolute. The cleaned paper stock suspension issuing from these lines or conduits 10 then flows through a conduit or line 11 to a deaeration apparatus 5, defining, for instance, a first deaeration stage, where the cleaned paper stock suspension is deaerated. More explicitly, it will be recognized that the cleaned paper stock suspension is delivered into a chamber or space 8 of the deaeration apparatus 5 which is located beneath a distributor or distributor device 6. A collecting trough or receiver 4" for the cleaned paper stock suspension is arranged adjacent to and beneath the distributor or distributor device 6.

In the exemplary embodiment under discussion, this distributor or distributor device 6 delimits the chamber or space 8 and is provided with suitable means, here specifically, is provided with a predetermined number of bores 7a extending through such distributor 6 and defining throughflow openings 7. The construction of these bores 7a defining the throughflow openings 7 is responsible for the desired properties or characteristics of partial jets 2 flowing in a predetermined direction of movement through the distributor 6, and, in particular, with regard to their number, volume, velocity and turbulence. Advantageously, the bores 7a each have the shape of a stepped diffusor or diffusor means 104 wherein, in the exemplary depicted arrangement of FIG. 1, each such bore 7a constricts or has a reduction in its cross-sectional area in the predetermined direction of movement or flow of the associated partial jet 2 therethrough as viewed from the inlet side 106 to the outlet side 108 thereof. As a result, at the individual stepped portions 110 of the stepped diffusors 104 a portion of the pressure energy of the throughflowing partial jets 2 can be converted into turbulence.

However, it is here specifically observed that other designs of turbulence generators or turbulence-increasing structure can be provided for the partial jets 2 and such will be explained more fully hereinafter.

By virtue of the physical correlation of the individual parts of the installation there is ensured, in the exemplary embodiment under discussion with reference to FIG. 1, that the dimension A between the level 18 of the white water in the white water container or vat 102 of the papermaking machine and the water level at the overflow 112 of the deaeration apparatus 5 is in the order of between 9 meters and 12 meters.

Continuing and as will be appreciated by further inspecting FIG. 1, the deaeration apparatus 5 comprises an enclosure means, such as a container or housing 130 which encloses a compartment 105 containing a further chamber or space 4 within which there are formed the partial jets 2 and, here, as shown by way of example only, located above the chamber or space 8. By virtue of the arrangement and design of the bores 7a forming the throughflow openings 7 there is established an absolute pressure of approximately 0.5 to 0.8 bar absolute in the chamber 8 which, as will be further considered shortly works against a pressure of about 0.05 bar absolute prevailing in the chamber 4, resulting in a jet velocity of each partial jet 2 in a range of approximately 10 m/sec. to 12 m/sec., and each such partial jet 2 has a throughflow volume or volume flow in a range of about 50 liters/min. to 80 liters/min. The turbulent partial jets 2 are directed towards an impact member 3a, here an impact wall 3 where there occurs total spray formation or atomization of the partial jets 2. Consequently, the air entrapped in the liquid of the partial jets 2 is released in an extremely efficient manner and can be removed, as by suction, through an air withdrawal or removal means 24, such as a conduit, from the closed chamber 4 of the compartment 105 and which is bounded by the impact wall 3. As previously indicated, this takes place at a negative pressure or vacuum of about 0.05 bar absolute prevailing in the chamber 4 where the paper stock suspension to be deaerated is approximately in a boiling state and has been atomized into a state having maximum surface exposure, that is, maximum exposed surface area. A suitable vacuum generating means 107, such as a vacuum pump can be used to establish the indicated negative pressure or vacuum of approximately 0.05 bar absolute in the chamber or space 4.

At this point and as an example there is compared a jet having a diameter of 80 mm. with one having a jet diameter of 12 mm. With the division of the stock suspension stream, as proposed by the present invention, into a great many partial jets each of which have, for example, a throughflow volume of about 80 liters/min. in contrast, as in the past, a quantity as dictated by the cleaner throughput of, for example, 1000 liters/min. for each jet, there then results an increase in the length-related jet surface by a factor of approximately 2.5.

Continuing, it will be appreciated the deaerated paper stock suspension issuing from the deaeration apparatus 5 at the outlet or discharge 12 is here still subjected to sorting or classifying at a suitable sorting or classification device 13. Only the good stock leaving the sorting or classification device 13 is supplied to the papermaking machine, generally indicated in FIG. 1 by reference character PM. A continuously available small excess of the deaerated paper stock suspension is recycled via the return conduit or line 14 leading to the container 102 for admixing with the paper stock suspension which is to deaerated and delivered by the line or conduit 1.

An overflow or reject portion flowing through the conduit or line 15 of the cleaner or cleaner installation 9 is subjected to a coarse deaeration at a coarse deaeration device 16. The good stock leaving the coarse deaeration device 16 and flowing through the conduit or line 17 and feed pump 17a is admixed with white water collected at the papermaking machine PM and delivered via conduit or line 109 from the white water container 102. The resultant suspension is fed, for example, through a second cleaning stage 19, if desired or required deaerated in a second deaeration stage 25 operatively connected with the second cleaning stage 19, and then further processed in the papermaking machine PM. It is also possible for the good stock departing from the second cleaning stage 19 to be recycled back to the inlet side of the first cleaning stage defined by the cleaners 9a via the conduit or line 113.

In FIG. 1A there is depicted a variant construction of deaerating apparatus 5 as contemplated by the present invention. Here, the partial or individual jets 2 of the distributor 6 efflux from stepped diffusors 114 which widen or enlarge in size in the flow direction of the paper stock suspension to be deaerated, that is, the partial jets 2. In other words, with this construction and as clearly depicted in such FIG. 1A, the stepped bores 7b defining the throughflow openings 7 of the distributor 6 have an increased size or enlarged cross-sectional area in the direction of flow of the paper stock suspension therethrough. Moreover, the paper stock suspension is damned-up at the distributor 6, so that such is covered with the liquid of such paper stock suspension. Consequently, the stepped diffusors 114 of the distributor 6 are particularly effective for generating turbulence at the paper stock suspension flowing through the stepped bores 7b.

Turning attention now to FIGS. 2 to 7, there are depicted therein in respective fragmentary sectional views different possible constructions of the distributors or distributor devices 6. It will be observed that the bores 7a defining the throughflow openings 7 are constructed as stepped diffusors 19 (see, for instance, FIG. 2) or stepped diffusors 20 (see, for instance, FIGS. 3 and 4). As depicted for the embodiment shown in FIG. 2, the stepped bores 7a defining the throughflow openings 7 can decrease in size or cross-sectional area in the flow direction of the paper stock suspension therethrough as represented by the arrows 116, or conversely, as depicted, for example, in the two further embodiments shown in FIGS. 3 and 4, respectively, in special situations these stepped bores 7a defining the throughflow openings 7 can increase in size or cross-sectional area in the flow direction 116 of the paper stock suspension, that is, the partial jets 2 flowing therethrough. Furthermore, one or more steps or jumps or transitions 118 can be provided within the corresponding stepped diffusor 19 and 20.

Figure 2:
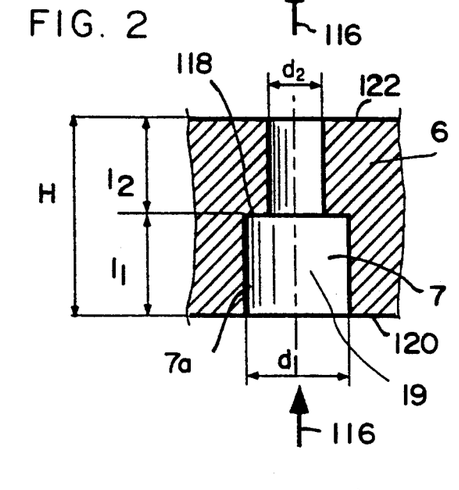
FIGS. 2, 3, 4, 5, 6 and 7 depict in respective fragmentary sectional views different advantageous constructions of deaeration bores defining the throughflow openings of various possible constructions of distributors and used for deaerating the paper stock suspension.
Figure 3:
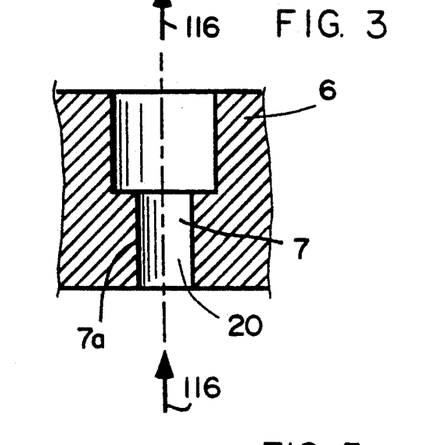
Figure 4:
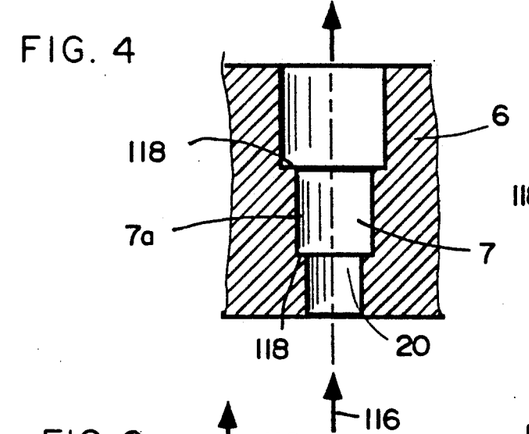

By way of example it is here indicated that stepped diffusors which have bores of decreasing size or cross-sectional area in the flow direction of the paper stock suspension therethrough, for example, as depicted for the embodiment of FIG. 2, can be dimensioned such that there are present the following dimensions or parameters:

| $d_2 = 5$ to 15 mm. | $d_1 = d_2 + 2$ to 30 mm. |
|---|---|
| $l_1 = 2$ to $6 d_1$ | $l_2 = 2$ to $6 d_2$ |
| $H = l_1 + l_2$ | |

In the foregoing equations, reference character "d" represents the bore diameter at the depicted locations indicated by the suffixes "1" and "2", reference character "l" represents the bore length at the depicted locations indicated by the suffixes "1" and "2", and reference character "H" represents the total bore length between the inlet side 120 and the outlet side 122 of the distributor 6.

Figure 5:
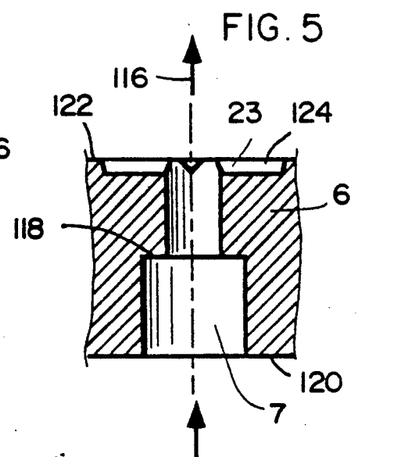

With reference to the modification of FIG. 5, there is depicted therein the possibility of providing grooves or depressions or channels 23 or the like at the outlet side 122 of the distributor 6, that is, at the outlet or discharge end of the relevant bore 7a at the region of the distributor surface 124. These grooves or depressions or channels 23 increase the turbulence of the partial jet of the paper stock suspension effluxing from the associated bore 7a.

Figure 6:
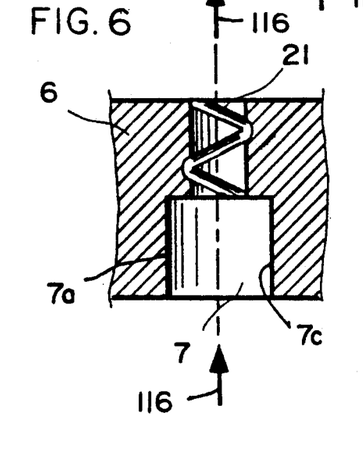

Regarding the further modification of FIG. 6, here helically-formed or screw-like grooves or groove-like depressions 21 or the like, which have been milled or otherwise appropriately machined at the distributor 6 at the interior wall or inner surface 7c of the bores 7a defining the throughflow openings 7, bring about a tearing apart or disintegration of the partial jet following its departure from the related bore 7a.

Figure 7:
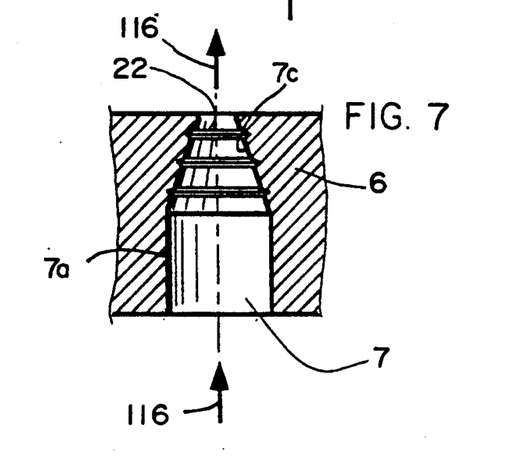

An analogous turbulence-increasing action is afforded by the transverse grooves or groove-like depressions or channels 22 or the like provided at the inner surface 7c of the depicted bore 7a forming the throughflow opening 7 of the modified embodiment of FIG. 7. Here, there is also shown a non-stepped configuration of the bore 7a, and specifically, there is depicted a continuously changing or tapered and decreasing cross-sectional area of the relevant bore opening 7 of such bore 7a. This arrangement may be considered to provide a turbulence nozzle-like construction.

Figure 8:
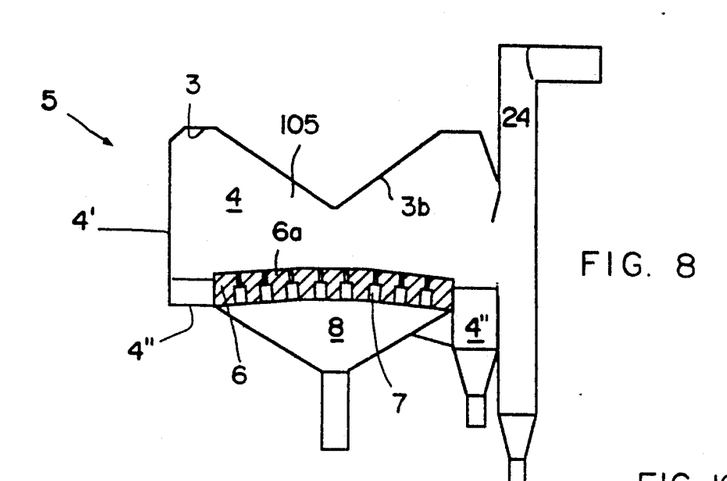
FIG. 8 schematically depicts a further construction of deaeration apparatus which can be used in the arrangement of FIG. 1.

Continuing further, it will be seen that the modified design of deaeration apparatus 5 shown in FIG. 8, comprises a plate or plate member 6a serving as the distributor 6. This plate 6a has a gradient or slope which descends in the direction of the adjacent lower situated collecting trough or receiver 4", thereby bringing about a relatively rapid run-off of the paper stock suspension returned or recycled from the chamber 4.

Figure 10:
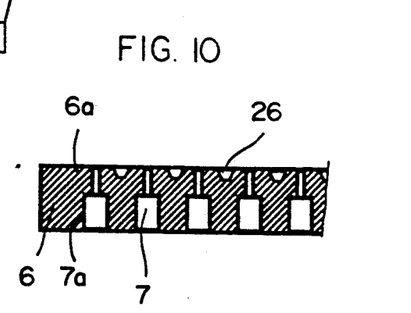
FIG. 10 schematically depicts in fragmentary sectional view a further construction of distributor for the deaeration apparatus of the present invention.

As particularly well depicted in FIG. 10, the undesirable collection of paper stock suspension above the distributor 6 can be prevented by providing, as there shown, open channels or grooves 26 through which there can be removed the paper stock suspension.

Figure 11:
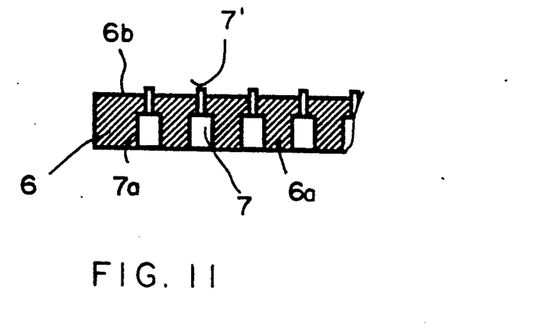
FIG. 11 again schematically depicts in fragmentary sectional view a still further possible construction of the distributor for the deaeration apparatus of the present invention.

In the modification of the distributor or distributor device 6 as shown in FIG. 11, the bores 7a defining the throughflow openings 7 can be extended beyond the distributor 6 and specifically beyond its top or upper surface 6b through the provision of extensions or prolongations 7' defining outlet mouths which afford an unhindered efflux of the related partial jet of paper stock suspension from each such prolonged bore 7a.

Figure 9:
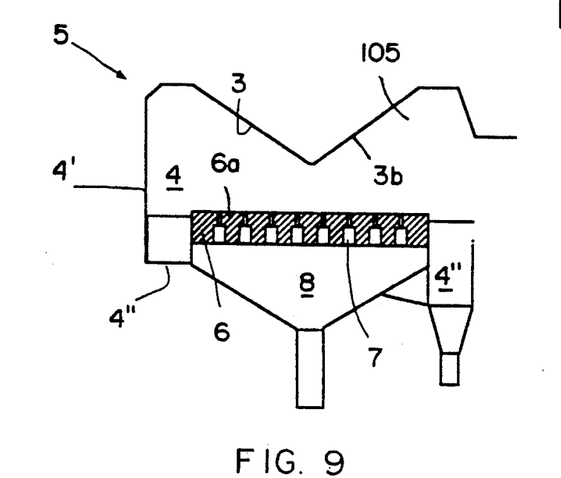
FIG. 9 schematically depicts yet a further construction of deaeration apparatus which can be used in the arrangement of FIG. 1.

Reverting again to the modified construction of deaeration apparatuses depicted in FIG. 8 and the still further modification of FIG. 9, it is here mentioned that additional measures for improving the outflow of the aerated paper stock suspension can be realized by designing the impact member 3a, here the impact wall 3 of each of the embodiments of FIGS. 8 and 9 so as to have a wall section 3b at its central region which is situated lower at such central region, that is to say, extends in the direction of the distributor 6 into the chamber or space 4 of the compartment 105 so as to be situated closer to the distributor 6, thereby producing a desired guidance of the flow of the deaerated paper stock suspension.

At this point it is additionally mentioned that various combinations of the herein described features or measures can be carried out to create still further embodiments which have not been particularly illustrated but will readily suggest themselves to those skilled in the art.

It is here also remarked that the proposed deaeration method for paper stock suspensions and the equipment used for accomplishing such also can be advantageously employed for the deaeration of recycled water and white water, and such deaerated water then can be used, for example, for the sedimentation of fibers, solids and sludge, for instance, in sedimentation equipment, such as sedimentation funnels.

While there are shown and described present preferred embodiments of the invention, it is distinctly to be understood the invention is not limited thereto, but may be otherwise variously embodied and practiced within the scope of the following claims.

What is claimed is:

1. An apparatus for deaerating a paper stock suspension, comprising:
   means enclosing a compartment;
   said compartment including a first chamber;
   means for establishing a negative pressure in the first chamber;
   an impact member provided for the first chamber;
   a distributor means within the compartment for forming partial jets of the paper stock suspension to be deaerated;
   said distributor means comprising means for directing said partial jets against the impact member in order to cause spraying of the paper stock suspension so as to separate air from the partial jets;
   said distributor means comprising a plate provided with bore means defining throughflow openings for the formation of the partial jets of the paper stock suspension to be deaerated;
   said compartment including a second chamber for infeed thereto of the paper stock suspension which is to be deaerated, the plate dividing the compartment into the first chamber and the second chamber;
   a collecting trough for receiving and removing the deaerated paper stock suspension arranged adjacent to and beneath the plate;
   means for removing deaerated paper stock suspension from the first chamber;
   means for removing the air separated from the paper stock suspension from the first chamber;
   said bore means being arranged in the plate such that the entirety of the paper stock suspension stream is divided into a plurality of partial jets defining small partial jets each having a volume flow of maximum 100 liters/min.; and
   said bore means being provided with means for increasing turbulence of the partial jets effluxing from the bore means at an outer surface of each of said partial jets.

2. The apparatus for deaerating a paper stock suspension according to claim 1, wherein:
   said impact member comprises an impact wall provided for the compartment.

3. The apparatus for deaerating a paper stock suspension according to claim 1, wherein:
   said throughflow openings of said bore means of said distributor means decrease in cross-sectional area in a predetermined direction of flow of the partial jets therethrough.

4. The apparatus for deaerating a paper stock suspension according to claim 1, wherein:
   said bore means of said distributor means define as said throughflow openings stepped diffusor-like throughflow openings each having at least one step-like portion; and
   each said step-like portion decreasing in cross-sectional area in a predetermined direction of flow of the partial jets therethrough.

5. The apparatus for deaerating a paper stock suspension according to claim 1, wherein:

said bore means of said distributor means define as said throughflow openings stepped diffusor-like throughflow openings each having at least one step-like portion and which increase in cross-sectional area in a predetermined direction of flow of the partial jets therethrough.

6. The apparatus for deaerating a paper stock suspension according to claim 1, wherein:
said bore means comprise turbulence nozzle means.

7. The apparatus for deaerating a paper stock suspension according to claim 1, wherein:
each of the bore means has an inner surface; and
said means for increasing turbulence of the partial jets effluxing from the bore means at the outer surface of said partial jets comprise groove-like depressions provided at the inner surface of each of the bore means and effective upon the partial jets in a direction substantially transverse to a predetermined direction of flow of the partial jets through the bore means.

8. The apparatus for deaerating a paper stock suspension according to claim 1, wherein:
each of the bore means has an inner surface; and
said means for increasing turbulence of the partial jets effluxing from the bore means at the outer surface of said partial jets comprise depression means provided at the inner surface of each of the bore means for imparting a helical-like spin flow to the partial jets.

9. The apparatus for deaerating a paper stock suspension according to claim 1, wherein:
said means for increasing turbulence of the partial jets effluxing from the bore means at the outer surface of each of said partial jets comprise groove means disposed at a location where the bore means open into the distributor means.

10. The apparatus for deaerating a paper stock suspension according to claim 1, further including:
the means enclosing the compartment comprise a container.

11. The apparatus for deaerating a paper stock suspension according to claim 1, further including:
cleaner means for separating deleterious particles from the paper stock suspension so as to produce good stock; and
means for delivering the good stock for deaeration to the second chamber.

12. An apparatus for deaerating a paper stock suspension, comprising:
means enclosing a compartment;
said compartment including a first chamber;
means for establishing a negative pressure in the first chamber;
an impact member provided for the first chamber;
means within the compartment for forming partial jets of the paper stock suspension to be deaerated;
said forming means directing said partial jets against the impact member in order to cause spraying of the paper stock suspension so as to separate air from the partial jets;
said forming means comprising distributor means provided with bore means defining throughflow openings for the formation of the partial jets of the paper stock suspension to be deaerated;
said compartment including a second chamber for infeed thereto of the paper stock suspension which is to be deaerated and located in cooperative relationship with respect to the distributor means;
means for removing deaerated paper stock suspension from the first chamber;
means for removing the air separated from the paper stock suspension from the first chamber;
said bore means being arranged in the distributor means such that the paper stock suspension stream is divided into a plurality of partial jets defining small partial jets each having a volume flow of maximum 100 liters/min.;
said bore means being provided with means for increasing turbulence of the partial jets effluxing from the bore means at an outer surface of each of said partial jets;
cleaner means for separating deleterious particles from the paper stock suspension so as to produce good stock;
means for delivering the good stock for deaeration to the second chamber;
the second chamber is located beneath the distributor means;
the good stock emerges from the cleaner means at a pressure of about 1.4 to 1.8 bars absolute;
said delivering means delivering the good stock at said pressure into the second chamber beneath the distributor means where there prevails a pressure of about 0.5 to 0.8 bar absolute which works against a pressure of approximately 0.05 bar absolute prevailing in the first chamber;
said first chamber being located above the distributor means; and
said means for establishing a negative pressure in the first chamber establishes a pressure of approximately 0.05 bar absolute in the first chamber.

13. The apparatus for deaerating a paper stock suspension according to claim 1, wherein:
said bore means define throughflow openings structured such that the velocity of the partial jets flowing therethrough amounts to about 10 m/sec. to 12 m/sec; and
each of the partial jet has a volume flow of about 50 liters/min. to 80 liters/min. at an absolute pressure of about 0.05 to 0.8 bar.

14. The apparatus for deaerating a paper stock suspension according to claim 1, wherein:
said plate having a surface provided with groove means for promoting rapid withdrawal of the deaerated paper stock suspension into the collecting trough.

15. The apparatus for deaerating a paper stock suspension according to claim 1, wherein:
said plate having a surface provided with channel means for promoting rapid withdrawal of the paper stock suspension into the collecting trough.

16. The apparatus for deaerating a paper stock suspension according to claim 1, wherein:
extension means provided for the bore means for defining outlet mouths of the bore means which extend beyond a top surface of the plate.

17. The apparatus for deaerating a paper stock suspension according to claim 1, wherein:
said plate having a top surface; and
the top surface of the plate member possessing a downward gradient in the direction of the collecting trough.

18. The apparatus for deaerating a paper stock suspension according to claim 1, wherein:
the impact member comprising an impact plate; and said impact plate being structured and inclined such that said impact plate transports impacting deaerated paper stock suspension of the partial jets in the direction of the collecting trough.

19. An apparatus for deaerating a paper stock suspension, comprising:
   means enclosing a compartment;
   means for establishing a negative pressure in the compartment;
   an impact member provided for the compartment;
   a distributor within the compartment for forming partial jets of the paper stock suspension to be deaerated;
   said distributor comprising means for directing said partial jets against the impact member in order to cause spraying of the paper stock suspension so as to separate air from the partial jets;
   said distributor comprising a plate provided with bore means defining throughflow openings for the formation of the partial jets of the paper stock suspension to be deaerated;
   means for infeeding of the paper stock suspension which is to be deaerated to said compartment;
   means for removing deaerated paper stock suspension from the compartment, said means for removing comprising a collecting device for receiving and removing the deaerated paper stock suspension arranged adjacent to and beneath the plate;
   means for removing the air separated from the paper stock suspension from the compartment;
   said bore means being arranged in the distributor means such that the paper stock suspension stream is divided into a plurality of partial jets defining small partial jets each having a volume flow of maximum 100 liters/min.; and
   said bore means being provided with means for increasing turbulence of the partial jets effluxing from the bore means at an outer surface of each of said partial jets.

20. The apparatus for deaerating a paper stock suspension according to claim 1, wherein:
   the first chamber is located above the distributor means; and
   the second chamber is located beneath the distributor means.

21. The apparatus for deaerating a paper stock suspension according to claim 1, further comprising:
   a conduit for infeeding the paper stock suspension to be deaerated to the second chamber prior to the forming of partial jets.

22. The apparatus for deaerating a paper stock suspension according to claim 19, wherein:
   said means for infeeding of the paper stock suspension to said compartment comprising means for infeeding of the paper stock suspension to said compartment beneath the distributor; and
   said impact member is located above the distributor means.

23. The apparatus for deaerating a paper stock suspension according to claim 19, further comprising:
   a conduit for infeeding the paper stock suspension to be deaerated to the compartment prior to the forming of partial jets.

* * * * *